(12) United States Patent  (10) Patent No.: US 7,590,936 B1
Bendig  (45) Date of Patent: Sep. 15, 2009

(54) METHOD FOR EXTRACTING INFORMATION ASSOCIATED WITH A SEARCH TERM

(75) Inventor: Krista Bendig, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 65 days.

(21) Appl. No.: 10/675,838

(22) Filed: Sep. 30, 2003

(51) Int. Cl.
  *G06F 15/00* (2006.01)
  *G06F 17/00* (2006.01)
(52) U.S. Cl. ............... 715/272; 707/3; 707/6; 715/243
(58) Field of Classification Search .......... 715/517, 715/539; 707/3, 102, 6
  See application file for complete search history.

(56) References Cited

U.S. PATENT DOCUMENTS

| | | | |
|---|---|---|---|
| 5,305,435 A | 4/1994 | Bronson | 715/777 |
| 5,532,715 A | 7/1996 | Bates et al. | 345/384 |
| 5,542,040 A | 7/1996 | Chang et al. | 715/778 |
| 5,544,360 A | 8/1996 | Lewack et al. | 707/1 |
| 5,649,193 A * | 7/1997 | Sumita et al. | 707/103 R |
| 5,745,899 A | 4/1998 | Burrows | 707/102 |
| 6,006,221 A * | 12/1999 | Liddy et al. | 707/5 |
| 6,014,662 A | 1/2000 | Moran et al. | 707/3 |
| 6,014,665 A | 1/2000 | Cullis | 707/5 |
| 6,070,157 A * | 5/2000 | Jacobson et al. | 707/1 |
| 6,175,830 B1 * | 1/2001 | Maynard | 707/5 |
| 6,301,586 B1 | 10/2001 | Yang et al. | 707/104.1 |
| 6,338,058 B1 * | 1/2002 | Jacobson et al. | 707/3 |
| 6,370,533 B1 | 4/2002 | Sato et al. | 707/10 |
| 6,393,460 B1 | 5/2002 | Gruen et al. | |
| 6,460,029 B1 | 10/2002 | Fries et al. | 707/3 |
| 6,484,166 B1 * | 11/2002 | Maynard | 707/5 |
| 6,571,234 B1 | 5/2003 | Knight et al. | 70/3 |
| 6,571,236 B1 | 5/2003 | Ruppelt | |
| 6,578,022 B1 | 6/2003 | Foulger et al. | 6/45 |
| 6,636,853 B1 * | 10/2003 | Stephens, Jr. | 707/10 |
| 6,654,758 B1 | 11/2003 | Teague | |
| 6,671,683 B2 * | 12/2003 | Kanno | 707/5 |
| 6,741,268 B1 | 5/2004 | Hayakawa | |
| 6,801,909 B2 | 10/2004 | Delgado et al. | |
| 6,839,702 B1 | 1/2005 | Patel et al. | 707/3 |
| 6,845,484 B1 * | 1/2005 | Kraft et al. | 715/514 |
| 6,947,930 B2 | 9/2005 | Anick et al. | 707/5 |

(Continued)

OTHER PUBLICATIONS

Angelo, Mike, "Mozilla 0.9.9 Browser-Sute Milestone Released Behind Schedule", MozillaQuest Magazine, Mar. 11, 2002, 13 pp.

(Continued)

*Primary Examiner*—Nathan Hillery
(74) *Attorney, Agent, or Firm*—Merchant & Gould LLC (57) ABSTRACT

Extracting tagged data items that may be associated with results of a search in an electronic document and presenting the tagged data items through a graphical user interface (GUI). The tagged data may be presented in a separate window displaying search results. The tagged data items may be presented adjacent to individual search results or at the top of a window displaying search results. The displayed tagged items may be presented as hyperlinks that enable a user to move to a section of an electronic document containing that tagged data item. The tagged data items, which may include names, physical addresses, e-mail addresses, universal resource locators (URLs), dates, and telephone numbers, may represent a subset of the tagged data item categories contained in the electronic document.

26 Claims, 10 Drawing Sheets

U.S. PATENT DOCUMENTS

| | | | |
|---|---|---|---|
| 7,062,483 | B2 | 6/2006 | Ferrari et al. |
| 7,113,943 | B2 | 9/2006 | Bradford et al. |
| 7,143,348 | B1 | 11/2006 | Krause |
| 7,162,686 | B2 | 1/2007 | Blazejewski et al. |
| 7,296,016 | B1 | 11/2007 | Farach-Colton et al. |
| 2001/0007987 | A1 | 7/2001 | Igata |
| 2001/0049706 | A1 | 12/2001 | Thome |
| 2002/0016787 | A1* | 2/2002 | Kanno ............... 707/5 |
| 2002/0040311 | A1* | 4/2002 | Douglass et al. ........ 705/7 |
| 2002/0059270 | A1 | 5/2002 | Schlabach et al. ...... 707/100 |
| 2002/0059395 | A1 | 5/2002 | Liou |
| 2002/0059425 | A1* | 5/2002 | Belfiore et al. ........ 709/226 |
| 2002/0069223 | A1* | 6/2002 | Goodisman et al. ...... 707/513 |
| 2002/0080180 | A1 | 6/2002 | Mander et al. ......... 345/769 |
| 2002/0089533 | A1 | 7/2002 | Hollaar et al. |
| 2002/0091698 | A1 | 7/2002 | Young et al. .......... 707/10 |
| 2002/0103789 | A1 | 8/2002 | Turnbull et al. ....... 707/3 |
| 2002/0143828 | A1* | 10/2002 | Montero et al. ........ 707/533 |
| 2002/0143940 | A1* | 10/2002 | Chi et al. ............ 709/225 |
| 2002/0174202 | A1 | 11/2002 | Kohyama et al. ........ 709/220 |
| 2002/0198884 | A1 | 12/2002 | Eisinger .............. 707/10 |
| 2003/0014398 | A1 | 1/2003 | Ohta et al. ........... 707/3 |
| 2003/0076352 | A1 | 4/2003 | Uhlig et al. |
| 2003/0101047 | A1* | 5/2003 | Panttaja .............. 704/9 |
| 2003/0212673 | A1* | 11/2003 | Kadayam et al. ........ 707/3 |
| 2003/0217047 | A1 | 11/2003 | Marchisio |
| 2003/0233419 | A1 | 12/2003 | Beringer .............. 709/206 |
| 2004/0024790 | A1* | 2/2004 | Everett ............... 707/200 |
| 2004/0059996 | A1* | 3/2004 | Fasciano .............. 715/500.1 |
| 2004/0143564 | A1 | 7/2004 | Gross et al. .......... 707/1 |
| 2004/0153306 | A1* | 8/2004 | Tanner et al. ......... 704/4 |
| 2004/0168133 | A1 | 8/2004 | Wynn et al. ........... 715/541 |
| 2004/0236801 | A1 | 11/2004 | Borden et al. ......... 707/204 |
| 2004/0243941 | A1* | 12/2004 | Fish .................. 715/752 |
| 2004/0266414 | A1* | 12/2004 | Likwornik ............. 455/415 |
| 2005/0015366 | A1 | 1/2005 | Carrasco et al. ....... 707/3 |
| 2005/0071150 | A1* | 3/2005 | Nasypny ............... 704/9 |
| 2005/0192953 | A1* | 9/2005 | Neale et al. .......... 707/4 |

OTHER PUBLICATIONS

Byrd, Donald, "A Scrollbar-Based Visualation for Document Navigation", ACM, 1999, pp. 122-129.

"Circus Ponies NoteBook 1.1 Ships on the Mac OS X with Over 30 New Features and Enhancements", Market Wire, Jun. 2003, 4 pp.

U.S. Official Action mailed Jul. 10, 2007 in U.S. Appl. No. 10/675,701.

U.S. Official Action mailed Aug. 24, 2007 in U.S. Appl. No. 10/675,702.

U.S. Official Action mailed May 29, 2007 in U.S. Appl. No. 10/674,753.

U.S. Official Action mailed Oct. 10, 2007 in U.S. Appl. No. 10/674,762, 29 pages.

U.S. Official Action mailed Feb. 8, 2008 in U.S. Appl. No. 10/674,753, 25 pages.

U.S. Official Action mailed Apr. 16, 2008 in U.S. Appl. No. 10/675,701, 32 pages.

U.S. Official Action mailed Jul. 2, 2008 in U.S. Appl. No. 10/675,702, 29 pages.

U.S. Official Action mailed Jul. 21, 2008 in U.S. Appl. No. 10/674,762, 29 pages.

U.S. Official Action mailed Nov. 25, 2008 in U.S. Appl. No. 10/674,753.

U.S. Official Action mailed Dec. 31, 2008 in U.S. Appl. No. 10/675,702.

U.S. Official Action mailed Mar. 20, 2009 in U.S. Appl. No. 10/675,701.

U.S. Official Action mailed Oct. 14, 2008 in U.S. Appl. No. 10/675,701, 29 pgs.

U.S. Official Action mailed Apr. 24, 2009 in U.S. Appl. No. 10/674,753, 26 pgs.

U.S. Official Action mailed Jun. 22, 2009 in U.S. Appl. No. 10/675,702, pp. 1-35.

* cited by examiner

METHOD FOR EXTRACTING INFORMATION ASSOCIATED WITH A SEARCH TERM

FIELD OF THE INVENTION

The present invention relates to extracting information from an electronic document associated with a search term and more specifically with a method that identifies and displays tagged information contained in an electronic document where the tagged information is located in proximity to an occurrence of a search term.

BACKGROUND OF THE INVENTION

Electronic document editors are widely used in homes and businesses today. Familiar examples of these editors include word processing applications that operate on personal computers (PCs) and note-taking applications that operate on personal data assistants (PDAs). These applications strive to replace paper as the simplest means to record and communicate information. The utility of these applications increase when they can be tied to other software applications, such as drawing applications, spreadsheet applications, web browser applications, and contact management applications. Similarly, the utility of an electronic document editor is increased when the editor can manage certain pieces of information contained in an electronic document that are likely to be of special significance to a user, such as names and addresses.

When an individual takes notes, such as in a business meeting or a classroom, contact information within those notes may be of special significance to a note-taker. For example, an individual taking notes in a meeting may record a person's name and, near the recorded name, put that person's telephone number. This situation is the same whether the note-taker is using a paper and pencil or a free-form electronic document editor. However, in a free-form electronic document editor, or other electronic document editor, certain types of information can be identified by the electronic document editor and tagged.

One example of information tagging is the use of "SMART TAGS" in business productivity computer software applications by Microsoft Corporation of Redmond, Wash. One such application is "MICROSOFT WORD." The software application can recognize certain strings of text characters as representing one of a number of categories of data. These categories may include names, physical addresses, e-mail addresses, universal resource locators (URLs), dates, and telephone numbers. When the software application recognizes a string of characters as possibly falling into a specific category of information, the application tags that string. In other words, the application identifies that string within an electronic document as having the characteristics of the data category. The application may provide a visual or other indication to a user through a graphical user interface (GUI) that the data string has been tagged. The application also may provide the capability for a user to act on the data string as a special data type, for example, by allowing a user to add the information to an address book of a contact management software application.

One advantage of taking notes using a free-form document editor as compared to paper and pencil is the capability of searching the notes with a search routine. In other words, a search function of the electronic document editor allows the user to locate a specific word or phrase by designating the word or phrase as a search term. The search routine can look through a large number of pages of notes in a very short time. In contrast, a person searching through paper notes may exhaust a large amount of time while having to review every line of many pages of notes to locate the word of phrase of interest.

Although a search routine in an electronic document editor has advantages over visually, or otherwise manually, scanning pieces of paper, searches through electronic documents have a weakness. A user must know the word or phrase as it appears in the electronic document to locate that word or phrase. This weakness is ameliorated by the capability of a user to insert a search term that the user suspects is located near a word or phrase that the user is actually looking for but that the user does not know its exact content, such as a telephone number. The user can then go to the locations within an electronic document identified by the search routine as containing the search term and visually or otherwise search for the desired information. For example, if a user needs to know an individual's telephone number and the user suspects that the telephone number is recorded in an electronic document near the individual's name, the user can use the individual's name as a search term and browse through an electronic document at each identified location of that individual's name and look for a telephone number. This ameliorating process still requires a user to move to locations within an electronic document identified by a search routine as containing the search term and browse the electronic document manually to find the desired information.

What is needed is a method that combines the technology of information tags with the technology of a search routine. The desired electronic document editor can return, as a result of conducting a search on a search term, tagged information that is located near the search term in an electronic document, such that the user will not have to browse the electronic document to find the information.

SUMMARY OF THE INVENTION

The present invention provides a computer-implemented method for extracting tagged data items that may be associated with results of a search in an electronic document and presenting the tagged data items through a graphical user interface (GUI). The GUI can include a window for displaying the search results and a separate window for displaying the tagged data items. In the alternative, the GUI can present the tagged data items adjacent to individual search results or at the top of a window displaying search results. The displayed tagged items may be presented as hyperlinks that enable a user to move to a section of an electronic document containing that tagged data item. The tagged data items, which typically include names, physical addresses, e-mail addresses, universal resource locators (URLs), dates, and telephone numbers, may represent a subset of the tagged data item categories contained in the electronic document. A user may want to extract the tagged data items and have them displayed with search results since these tagged data items may represent facts about a search term that may be of interest to a user. Similarly, a user may have searched on a specific search term for the express reason of calling up data items located near the search term in a document, such as searching on a person's name to extract that person's telephone number.

In one aspect of the present invention, a computer-implemented method for displaying one or more tagged data items near a result of a search of an electronic document is provided. This method comprises the steps of (1) locating one or more results of the implemented search within the electronic document; (2) identifying one or more tagged data items present in the electronic document within a distance from each search result; and (3) displaying on a user interface a list of the one or more tagged items identified as within the distance from each search result.

In another aspect, a computer-implemented method for identifying one or more tagged data items near a result of a search of an electronic document is provided. This method comprises the steps of (1) implementing the search of the electronic document; (2) locating one of more results of the implemented search within the electronic document; and (3) determining if one or more tagged data items are present in the electronic document within a distance from each search result.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support a method for extracting tagged data items that may be associated with results of a search in an electronic document and presenting the tagged data items through a graphical user interface (GUI). The GUI can include a window for displaying the search results and a separate window for displaying the tagged data items. In the alternative, the GUI can present the tagged data items adjacent to individual search results or at the top of a window displaying search results. The displayed tagged items may be presented as hyperlinks that enable a user to move to a section of an electronic document containing that tagged data item. The tagged data items, which typically include names, physical addresses, e-mail addresses, universal resource locators (URLs), dates, and telephone numbers, may represent a subset of the tagged data item categories contained in the electronic document. A user may want to extract the tagged data items and have them displayed with search results since these tagged data items may represent facts about a search term that may be of interest to a user. Similarly, a user may have searched on a specific search term for the express reason of calling up data items located near the search term in a document, such as searching on a person's name to extract that person's telephone number.

Figure 1:
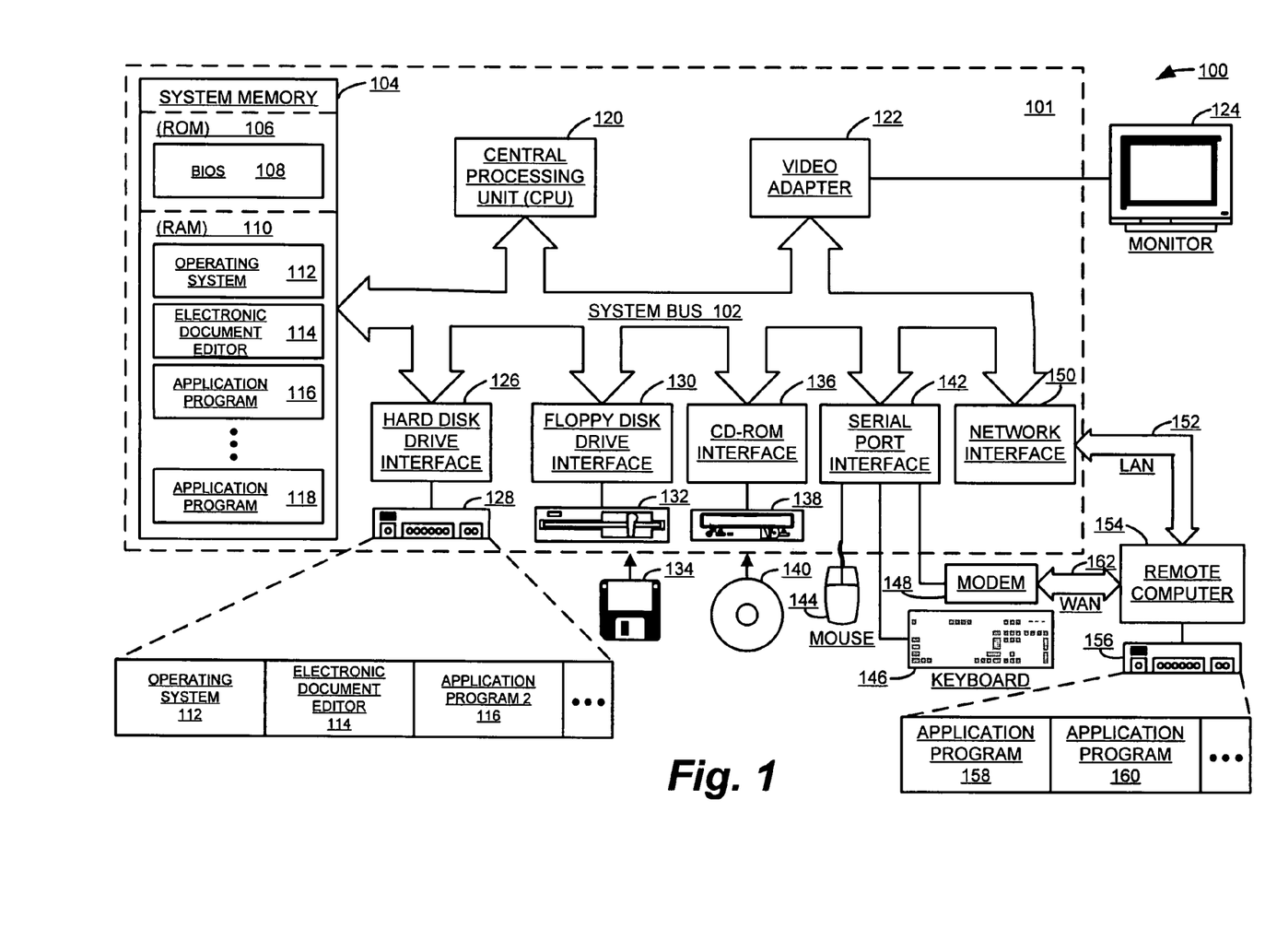
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, an electronic document editor 114, and multiple application programs 116-118. A representative embodiment of a document editor is disclosed in more detail below in connection with FIG. 2. Program modules typically include routines, sub-routines, programs, objects, components, data structures, etc., that perform particular tasks or implement particular abstract data types.

A user may enter commands and information into personal computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. In addition to the monitor, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150.

When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
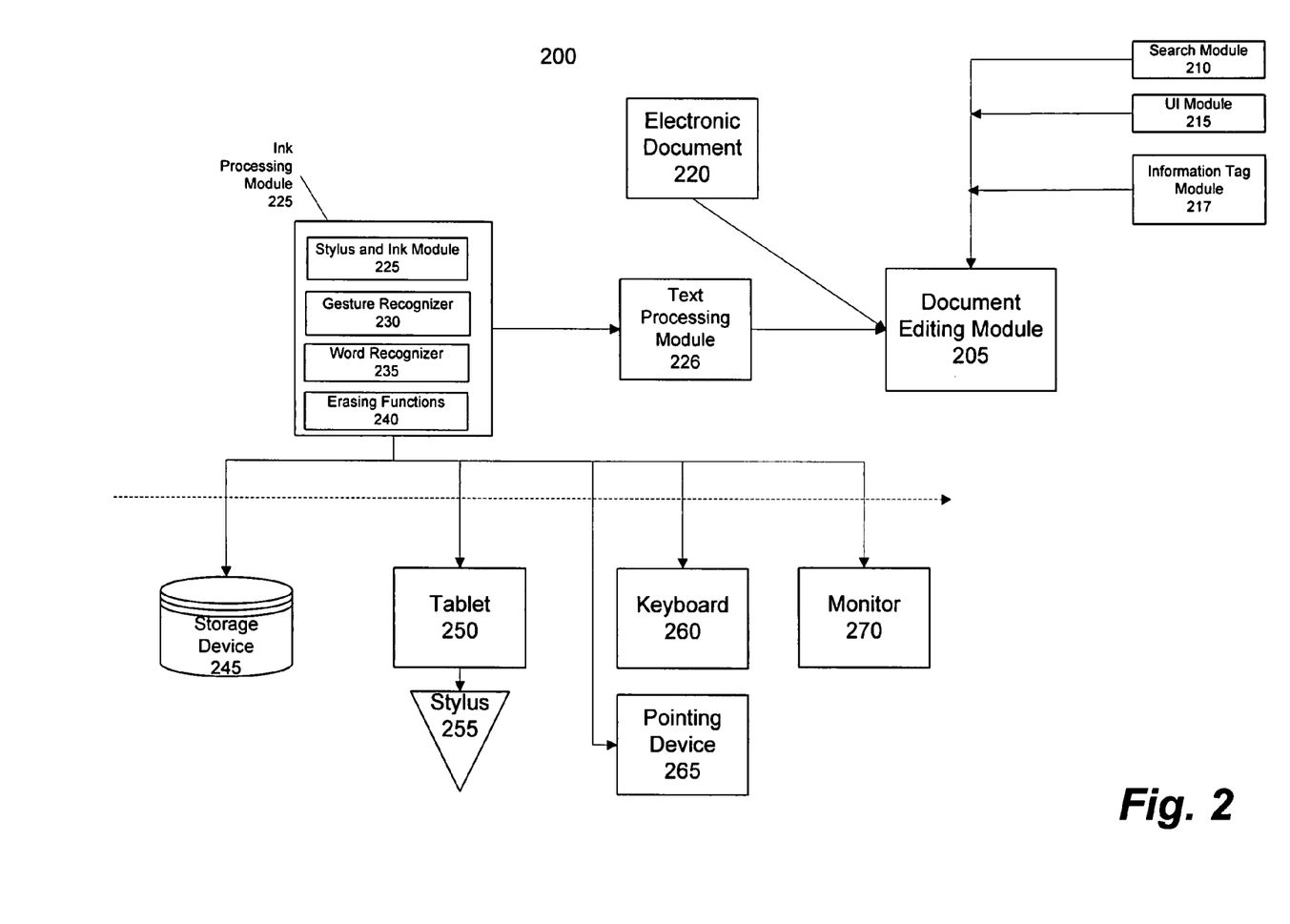
FIG. 2 is a block diagram depicting functional components of an exemplary electronic document editor and related input devices.

FIG. 2 is a block diagram depicting the primary functional components of an exemplary electronic document editor and related input devices for the representative operating environment of an electronic writing tablet, otherwise described as an electronic tablet. Specifically, FIG. 2 depicts an architecture 200 for an electronic writing tablet in the context of an electronic document editor constructed in accordance with an exemplary embodiment of the present invention. Conventional input devices are represented by the keyboard 260 and the pointing device 265 (e.g., mouse, trackball). Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200, an ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 205 facilitates manipulating electronic ink so that a user can create and modify an electronic document 220 with greater ease and sophistication. The document editing module 205 typically comprises a collection of software modules for controlling and manipulating electronic ink rendered on the monitor 270 and for presenting search results for a search of an electronic document.

For example, the exemplary document editing module 205 includes a search module 210, a UI Module 215, and an information tag module 217. A user may want to locate a word or phrase within an electronic document 220. The word or phrase, also referred to herein as a search term, can be inputted to the document editing module 205 by a user, through the keyboard 260, the stylus 255, or other input device. The exemplary search module 210 locates occurrences of the search term, also referred to herein as hits, in response to a user initiating a search, if the electronic document contains items that match the search term. The search module 210 typically causes the UI to distinctly display the hits to a user, such as by highlighting the hits in an electronic document 220 in a way that contrasts with the normal display of the electronic document's 220 content.

The exemplary UI module 215 controls the images displayed on the tablet 250 or the monitor 270. The UI module may accept input data from a user to the document editing module 205, such as when a user actuates a control displayed by the UI module 215 with a pointing device 265 or stylus 255. The UI module 215 displays a variety of images that can be used to input information to the document editing module 205, such as buttons, menus, drop-down boxes, and boxes that accept text characters.

The exemplary information tag module 217 identifies certain words or phrases in an electronic document 220 as belonging to one or more specific categories of data. For example, when a phrase such as "123 Main St." is input into an electronic document 220, the information tag module 217 identifies this phrase as a physical address. Similarly, when a phrase such as "404-555-9876" is input into an electronic document 220, the information tag module 217 identifies this phrase as a telephone number. The information tag module 217 causes the UI module 215 to provide a visual indication to a user that the word or phrase falls within a designated category of information. The category designations may be made by the document editing module 205 or a user, such as by selecting options in a menu.

The UI module 215 may also provide an on-object-user interface (OOUI) for the data item. This OOUI allows a user to use a pointing device 265 or stylus 255 and point at the word or phrase as it is being displayed on a monitor 270 or tablet 250. This pointing action causes a menu to appear that allows the user to perform additional actions on the word or phrase, such as adding the information to an address book or removing the tag. In other words, the OOUI can be used to specify that a word or phrase should not be categorized as indicated by the information tag module 217.

Exemplary embodiments of the present invention relate most directly to extracting tagged or specially-marked data items associated with a search term in an electronic document 220 and presenting the data items via a user interface. FIGS. 1 and 2 provide a general overview of the environments in which the inventors contemplate exemplary embodiments of the present invention will be used.

Figure 3:
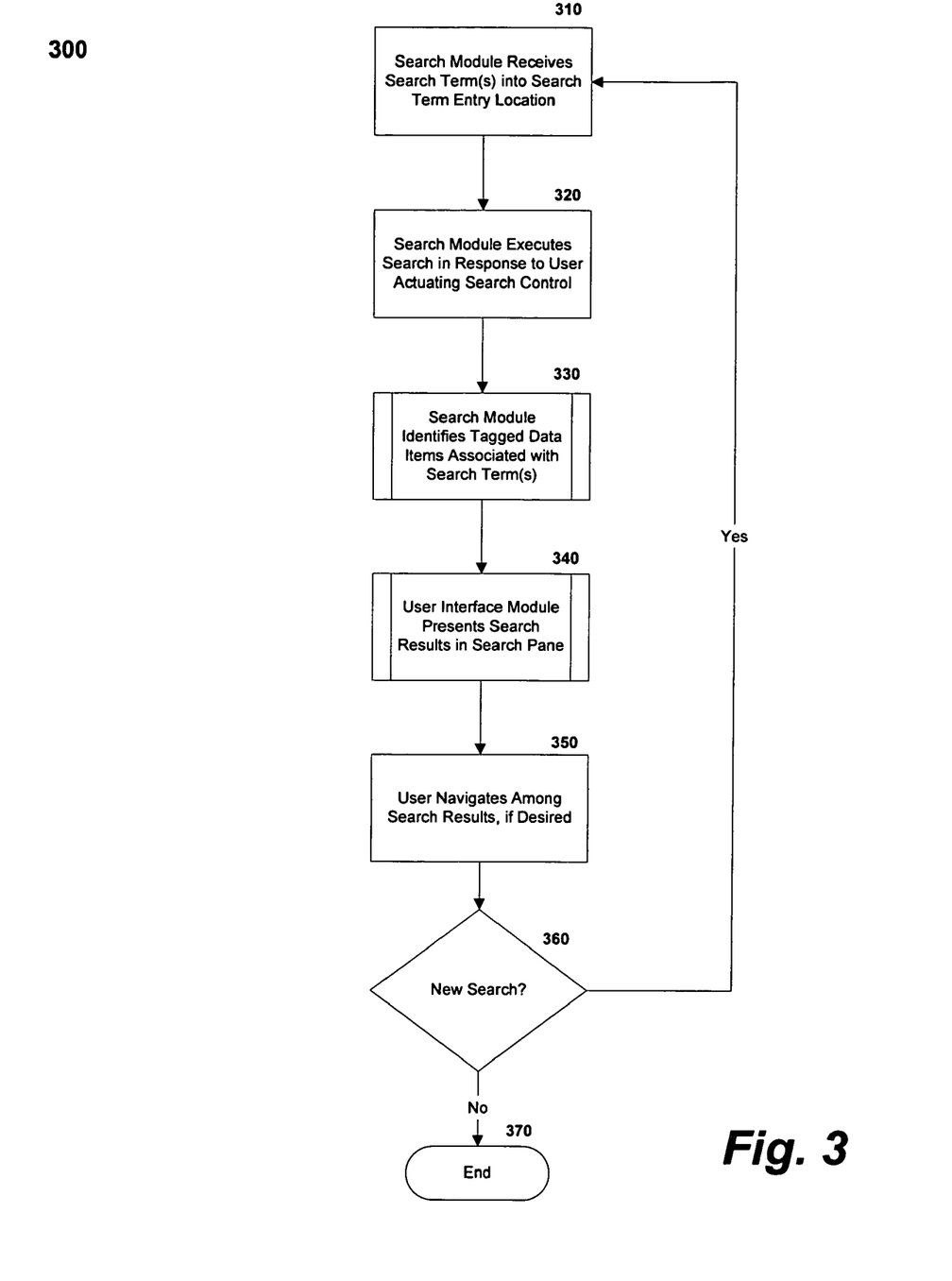
FIG. 3 is a flow diagram presenting a process for extracting specially-marked data items located near a result of a search of an electronic document in accordance with an exemplary embodiment of the present invention.

FIG. 3 is a flow diagram presenting a process 300 for extracting specially-marked data items located near a result of a search of an electronic document in accordance with an exemplary embodiment of the present invention. Referring to FIGS. 2 and 3, at step 310, a UI module 215 receives a search term. This step may be accomplished by a user entering the search term into a location of a GUI designed to accept the search term, such as a box for entering text characters. At step 320, a search module 210 receives the search term from the UI module 215 and executes the search of the electronic document to locate all search terms present in the document. This execution may be triggered by a user actuating a search initiation control presented on a GUI.

Figure 7:
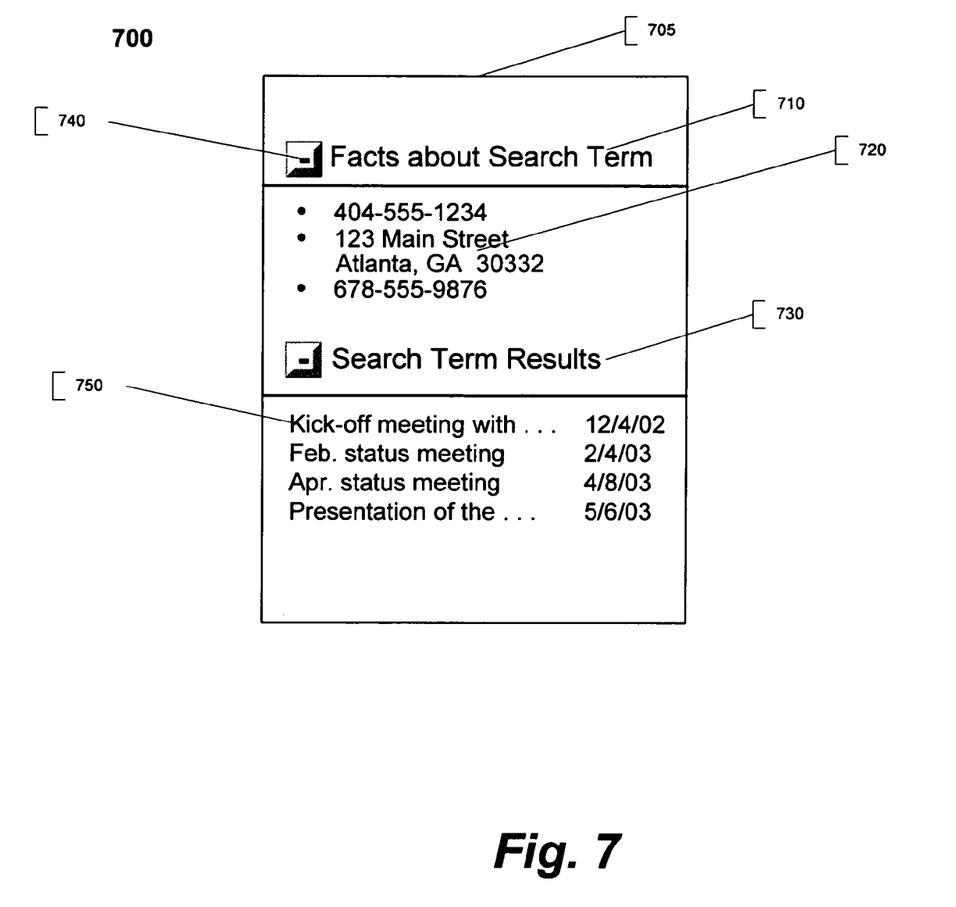
FIG. 7 is a display image showing a portion of a window presenting search results from a search of an electronic document in accordance with an exemplary embodiment of the present invention.

At step 330, the search module 210 identifies tagged data located near a search term within an electronic document 220. The identified tagged data items are associated with the search terms for the search of the electronic document This step is discussed in greater detail below, in conjunction with FIG. 4. At step 340, the UI module 215 presents search results received from the search module 210 to the user. The search results with include the tagged data items if the search module 210 identifies tagged data in step 330. This presentation may be in a separate search results window, as shown in FIG. 7. Step 340 is discussed in greater detail below, in conjunction with FIG. 5. At step 350, a user may navigate among the search results, if desired.

For some exemplary embodiments, the search results are presented in a window separate from a window containing the electronic document 220. The UI module 215 may link individual search results and tagged data items presented in the search results window to the location of the result or data item in the electronic document 220. As such, a user may be able to cause a portion of content within the electronic document 220 containing the result of the search or tagged data items to be displayed by actuating a hyperlink associated with the result or tagged data item. In other words, search results and tagged data items, as displayed in the search results window, may be formatted as hyperlink text and the user may be able to use a pointing device 265, such as a mouse or trackball, or a stylus 255 to actuate the hyperlink and cause a portion of the electronic document 220 containing that result or data item to be displayed on a monitor 270 or tablet 250 in a window containing the electronic document 220.

At step 360, the process 300 determines if a new search is to be performed. This determination may be based on the UI module 215 receiving a new search term. If so, the process 300 returns to step 310. If not, the process 300 ends at step 370.

Figure 4A:
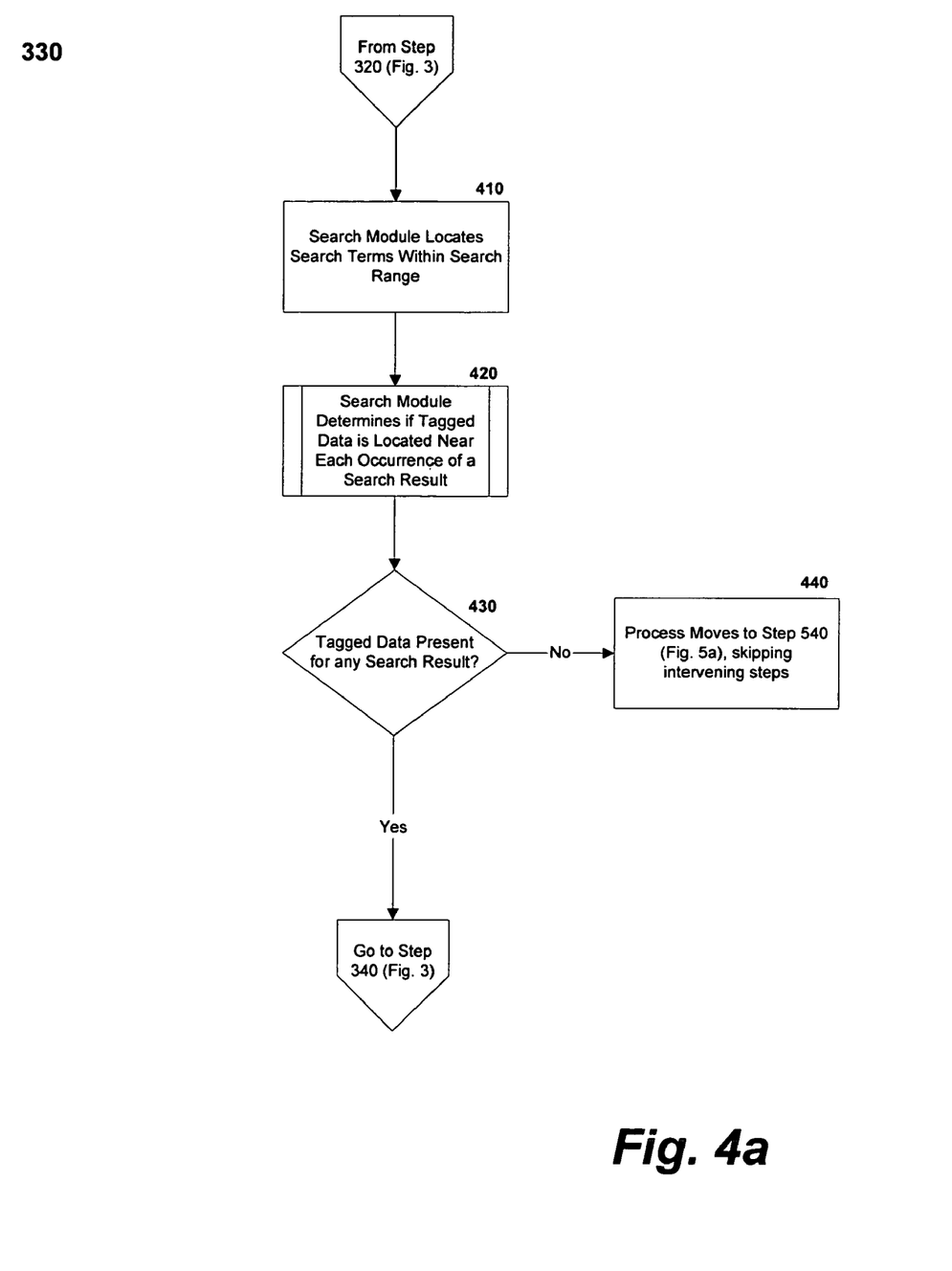
FIG. 4a is a flow diagram presenting a process for identifying specially-marked data items located near a result of a search of an electronic document in accordance with an exemplary embodiment of the present invention.

FIG. 4a is a flow diagram presenting a process 330 for identifying specially-marked data items located near a result of a search of an electronic document 220 in accordance with an exemplary embodiment of the present invention. Referring to FIGS. 2, 3, and 4a, at step 410, the search module 210 locates occurrences of the search term received at step 310 within a designated range. This range may be designated by a user and may include a single electronic document 220 or one or more portions of a single electronic document 220 or multiple documents. Alternatively, the document editing module 205 may specify the search range. This range may be a default range and the default range may be specified by a user, such as by selecting an option in a menu.

At step 420, the search module 210 identifies tagged information, also referred to herein as tagged data items, located near each occurrence of a search result. For an exemplary embodiment, the term "near" or "proximate" means between the same paragraph marks as the search term. Alternatively, the search module 210 may establish a different rule for what constitutes "near" or "proximate." This rule may be based on the number of lines or characters between the search result and the tagged information. For example, a rule may define "near" or "proximate" to mean within ten lines of text from the search term. Alternatively, a rule may define "near" or "proximate" based on linguistic or grammatical rules specific to the language of the text. One skilled in the art would appreciate that a large variety of rules could be established to determine if tagged information within an electronic document 220 is located "near" an occurrence of a search result. Step 420 is described in greater detail below, in conjunction with FIG. 4b.

Figure 5A:
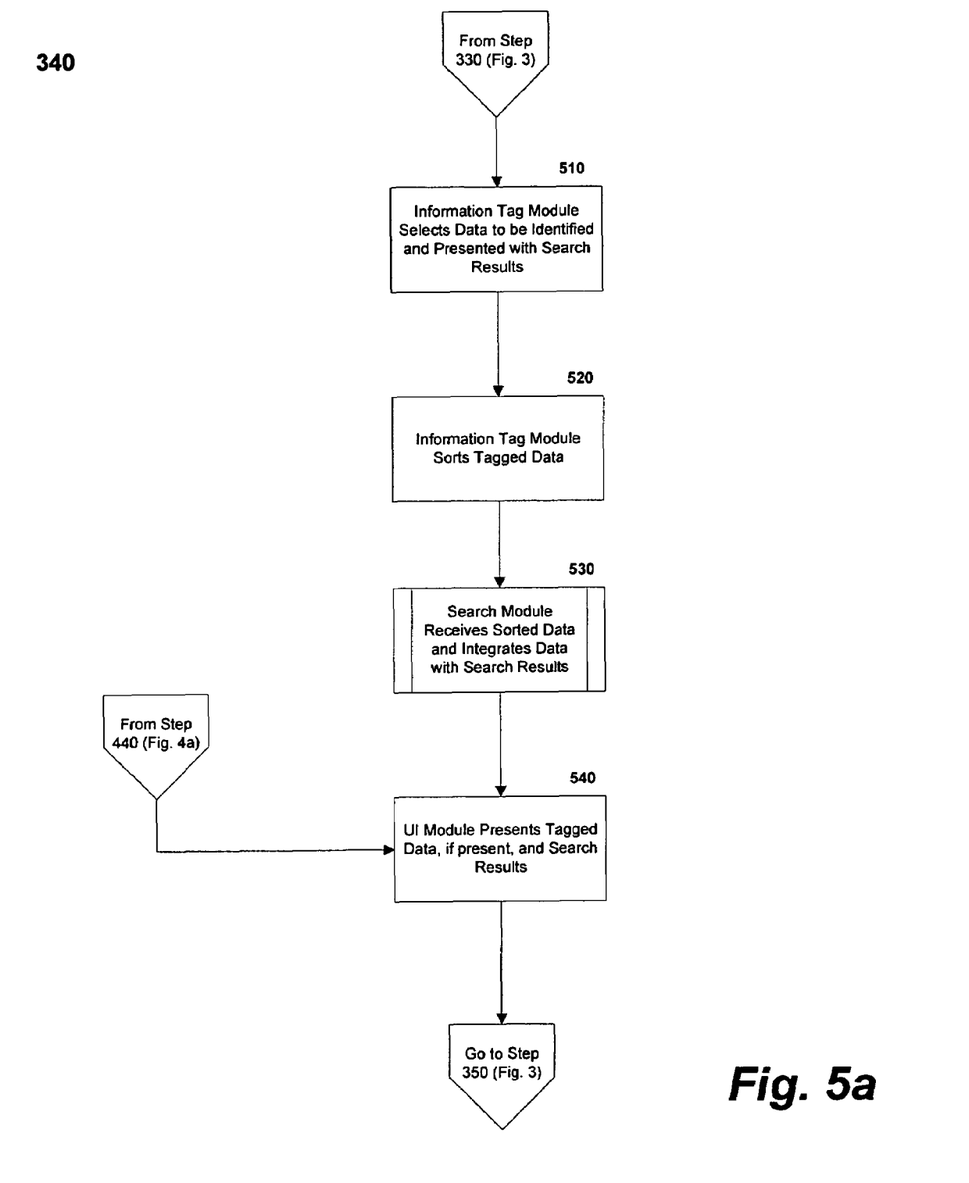
FIG. 5a is a flow diagram presenting a process for presenting specially-marked data items located near a result of a search of an electronic document in accordance with an exemplary embodiment of the present invention.

At step 430, the search module 210 determines if tagged information was located near one or more occurrences of a search term in the search range. If the result at step 430 is "No," the process 330 moves to step 440 and the process skips to step 540 (FIG. 5a). This step is discussed in greater detail below, in conjunction with FIG. 5a. If, at step 430, the result is "Yes,' then the process 330 moves to step 340 of process 300.

Figure 4B:
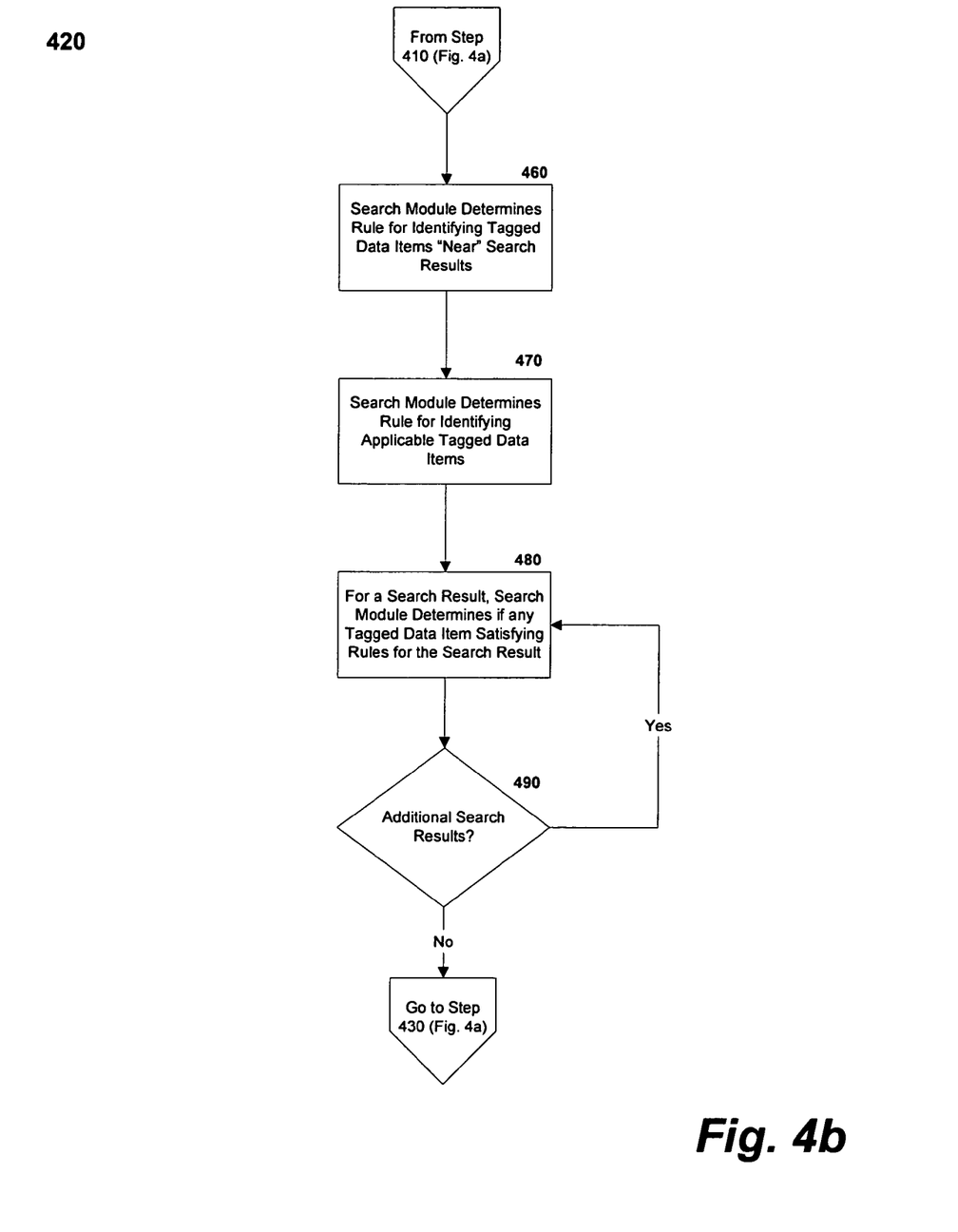
FIG. 4b is a flow diagram presenting a process for determining if specially-marked data items are located near a result of a search of an electronic document in accordance with an exemplary embodiment of the present invention.

FIG. 4b is a flow diagram presenting a process 420 for determining if specially-marked data items are located near a result of a search of an electronic document 220 in accordance with an exemplary embodiment of the present invention. Referring to FIGS. 2, 3, 4a, and 4b, at step 460, the search module 210 determines the proximity rule for identifying tagged data items near search results. This rule may be established by the document editing module 205 or by a user, such as by a user selecting an option in a menu. One example of a proximity rule is that all tagged data items between the same paragraph marks as a search term result are proximate, or near, that search term.

At step 470, the search module 210 determines a rule to identify applicable tagged data items. One rule may be to identify all tagged data items that satisfy the proximity rule of step 460. Alternatively, the search module 210 may have some grammatical semantic intelligence to help it decide if a tagged data item makes sense to be associated with the search term. For example, the search module 210 may have a rule that says that telephone numbers can only be facts about query terms that are proper nouns. As such, if a tagged data item representing a telephone number satisfied the proximity rule to a search term "Mary," it would be considered a fact about Mary, while if it was found near a fact term "cholesterol," it would not be considered a fact about cholesterol.

At step 480, the search module 210 determines, for each search result identified at step 410, if any tagged data items are proximate, or near, the search result. In other words, the search module 210 determines if the proximity rule is satisfied for any tagged data items with respect to a specific search result.

At step 490, the process 420 determines if additional search results exist, that is, whether there are additional search results that have yet to be evaluated at step 480. If so, the process 420 returns to step 480. As such, steps 480 and 490 form a loop that evaluates each occurrence of a search result identified at step 410. If no additional search results exist, then the process 420 moves to step 430 in process 330.

FIG. 5a is a flow diagram presenting a process 340 for presenting specially-marked data located near a result of a search of an electronic document in accordance with an exemplary embodiment of the present invention. Referring to FIGS. 2, 3, 4, and 5, at step 510, an information tag module 217 selects which types of tagged information will be identified and presented with search results. The information tag module 217 may tag data items from a large variety of information categories. Only a subset of those categories may be used in associating search term results with tagged information. For example, categories such as names, physical addresses, e-mail addresses, URLs, dates, and telephone numbers may be associated with search term results. Other categories, including categories for special industries, such as legal case names or sports teams' names, may be excluded from the association with search results. The list of categories that may be associated with search results may be selected by the document editing module 205 or selected by a user, such as by choosing options from a menu. At step 510, the information tag module 217 filters the results of step 420 such that tagged data items associated with selected information tag categories are returned with search results.

At step 520, the information tag module 217 sorts tagged data items that passed through the filter of step 510. This sorting step may include grouping categories together. This sorting step may also include prioritizing the data item categories. For example, all telephone numbers may be grouped together and presented as the first group of data items in the search result pane. Alternatively, the data items could be arranged as they are encountered in the search range, with the first encountered tagged data item, that is, the first data item encountered in the direction of the search, at the top of the list and so on. One skilled in the art would appreciate that the tagged data items could be arranged in a variety of ways.

At step 530, the search module 210 receives the data items sorted at step 520 and integrates the data items with the search results, that is, with the individual occurrences of the search term. In this integration step, all of the tagged data items may be presented at the top of the search results pane. Alternatively, each tagged data item could be presented adjacent to the search result that is near that data item, in other words, the search result that triggered including the tagged data item in the search results pane. Step 530 is described in greater detail below, in connection with FIG. 5b.

At step 540, the UI module 215 presents the tagged data items, if any are found, in the newly-opened search results pane in the order determined at step 530, in other words, either at the top of the search results pane or adjacent to individual search results. One skilled in the art would appreciate that these two alternative are not the only alternatives for presenting the results. For example, a combination of the two alternatives may be used, where some tagged data categories are presented at the top of a search results pane while other categories are presented adjacent to the individual search term results. In yet another alternative, all of the search results could be suppressed, such that the display window shows tagged data items associated with the search only.

Figure 5B:
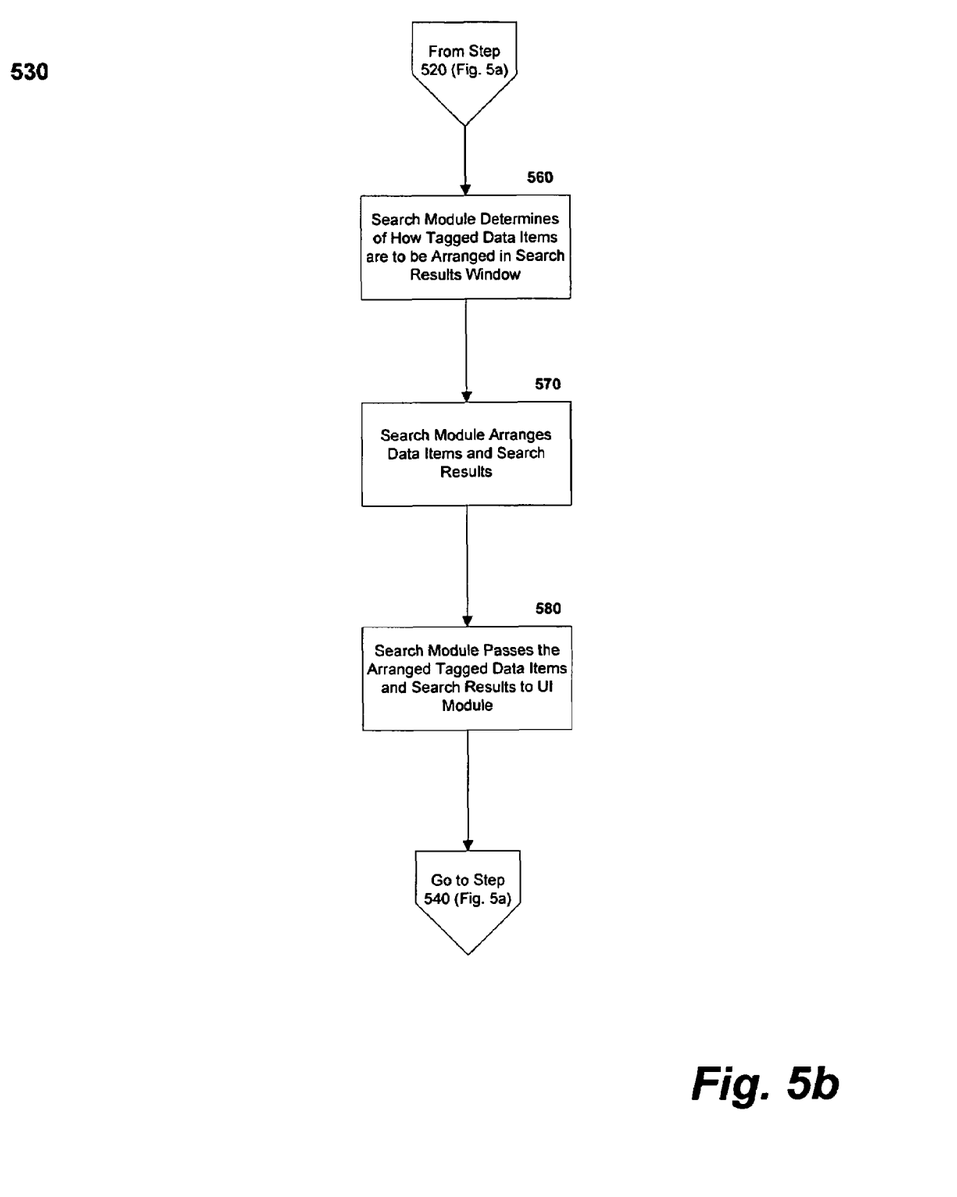
FIG. 5b is a flow diagram presenting a process for integrating specially-marked data items with the search results of a search of an electronic document in accordance with an exemplary embodiment of the present invention.

FIG. 5b is a flow diagram presenting a process 530 for integrating specially-marked data items with the search results of a search of an electronic document 220 in accordance with an exemplary embodiment of the present invention. At step 560, search module 210 determines how tagged items are to be arranged in a search results window. For example, the tagged data items may be arranged at the top of the window, with search results beneath them. Alternatively, a tagged data item could be presented adjacent to a search result that triggered including that data item in the list.

At step 570, the search module 210 arranges the tagged data items and search results according to the determination at step 560. At step 580, the search module 210 passes the arranged tagged data items and search results to the UI module 215. The process 530 them moves to step 540 in process 340.

Figure 6:
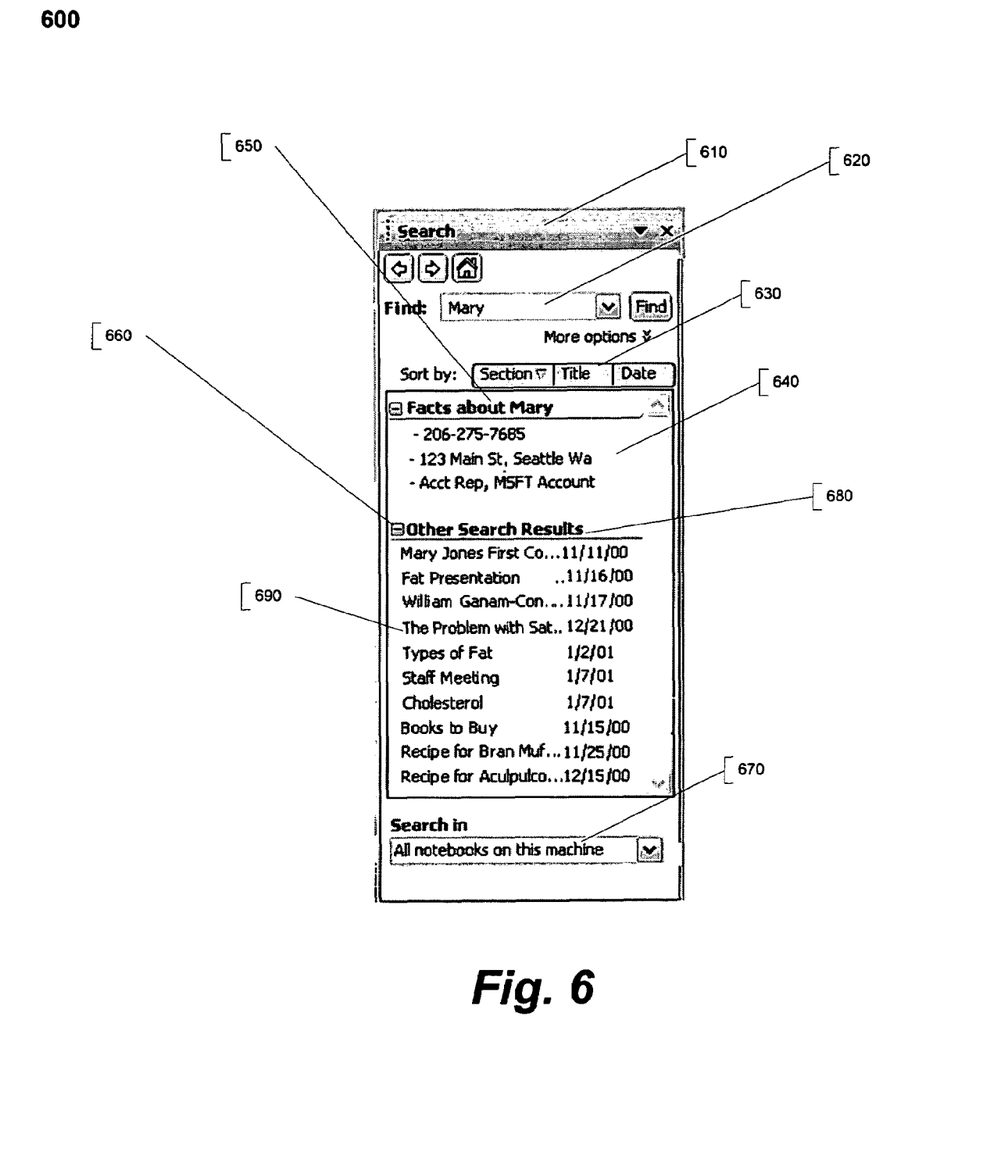
FIG. 6 is a display image showing a user interface having a window presenting search results and associated facts from a search of an electronic document in accordance with an exemplary embodiment of the present invention.

FIG. 6 is a display image 600 showing a window presenting search results and associated facts from a search of an electronic document in accordance with an exemplary embodiment of the present invention. Referring to FIGS. 2 and 6, search results may be displayed by the UI module 215 in a separate window 610 from an electronic document 220. The exemplary window pane 610 includes search controls, such as a box 620 for receiving text characters that may define a search term, such as a search term "Mary." The window pane 610 also includes controls 630 that define how the search results are displayed. The window pane 610 also includes a control 670 for a user to specify a range of a search. These specifications may be presented in a drop down menu.

The window pane 610 presents facts 640 associated with the search term "Mary." These facts 640 are presented beneath a heading 650, which reads "Facts about Mary." These facts 640 and heading 650 are presented on the top of a list that presents other search results 690.

The window pane 610 also presents search results 690 for review by a user in response to completion of a search of a electronic document 220. The results are presented under a search results heading 680, such as a heading 680 reading "Other Search Results." The results may also include a control 660 that enables a user to collapse a sublist of results. One skilled in the art would appreciate that search results and associated facts could be presented to a user in a variety of ways.

FIG. 7 is a display image 700 showing a portion of a window presenting search results from a search of an electronic document 220 in accordance with an exemplary embodiment of the present invention. Referring to FIGS. 2 and 7, the UI module 215 presents search results with tagged data items 720 appearing at the top of the search results window pane 705. The search results window pane 705 may include a label 710 over the presented tagged data items 720, such as "Facts about Search Term" or other descriptive label. The exemplary search results window pane 705 typically includes a control 740 for collapsing a sublist of facts or search results 750. The list of search term results 750 may be headed by a label 730 indicating that the sublist comprises search results rather than facts associated with the search term. For an exemplary embodiment, the UI module 215 may present the listed tagged data items 720 and search results 750 as hyperlinks, which may enable a user to click on the terms in the search results window pane 705 with a pointing device 265 or stylus 255 and cause a portion of an electronic document 220 containing that search term result or tagged data item to be displayed in a window.

Figure 8:
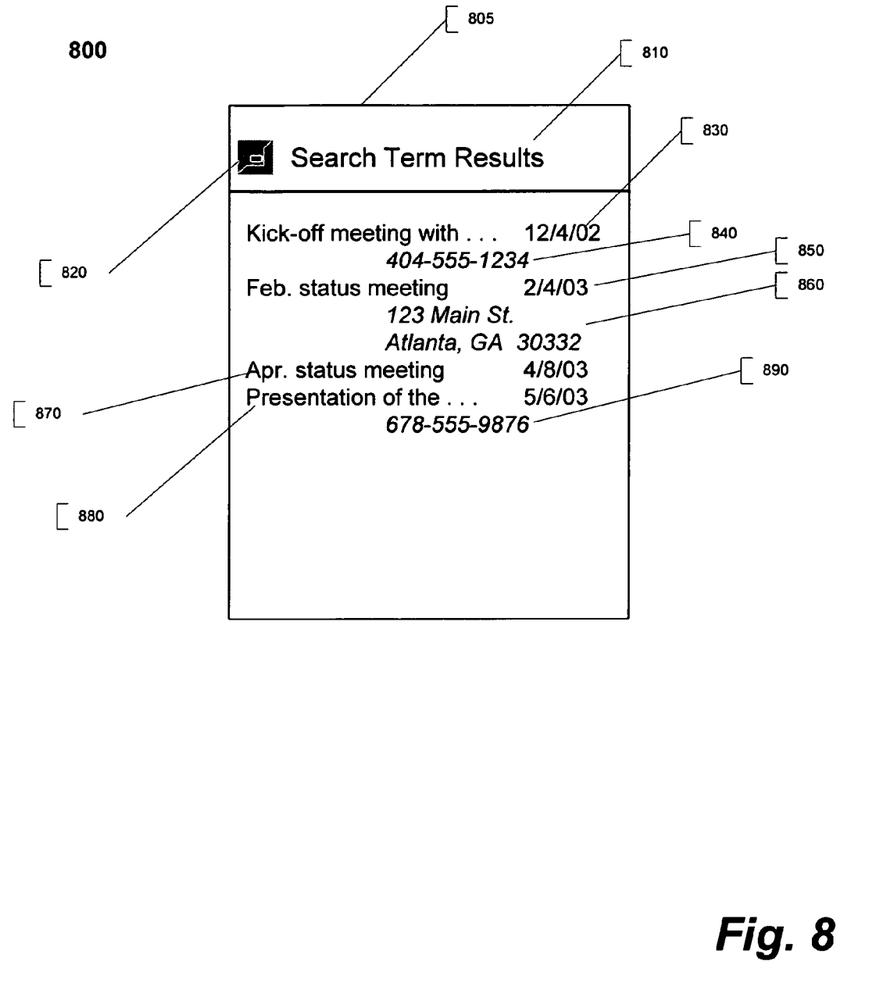
FIG. 8 is a display image showing a portion of a window presenting search results from a search of an electronic document in accordance with an alternative exemplary embodiment of the present invention.

FIG. 8 is a display image 800 showing a portion of a window presenting search results from a search of an electronic document 220 in accordance with an alternative exemplary embodiment of the present invention. Referring to FIGS. 2, 7, and 8, the UI module 215 presents search results 830, 850, 870, 880 with tagged data items 840, 860, 890 appearing adjacent to a search result 830, 850, 870, 880 in search results window pane 805. The search results window pane 805 includes a label 810 over the results, such as "Search Term Results and Facts" or other descriptive label. The search results window pane 805 includes a control 820 for collapsing a sublist of facts or search results. The list of search term results 830, 850, 870, 880 are presented in the search results window pane 805 grouped with facts associated with each search result. For example, a search term of "Smith" may be used. The term "Smith" may be found in a electronic document section entitled "Kick-off meeting with Project Alpha team." The search results window pane 805 may present that section title 830 as containing "Smith." The title 830 may be presented with ellipses ( . . . ) to indicate that the title is longer than that title printed in the search results window pane 805 and may include a date associated with that section. A telephone number, "404-555-1234," may have been identified near the occurrence of "Smith" in the electronic document section entitled "Kick-off meeting with Project Alpha team." The UI module 215 presents the telephone number "404-555-1234," 840 beneath the title "Kick-off meeting with . . . " 830 in the search results pane 805. The telephone number 840 may be presented in a different font type or a different alignment in the search results window pane 805. The UI module 215 presents the listed tagged data items 840, 860, 890 and search results 830, 850, 870, 880 as hyperlinks.

One skilled in the art would appreciate that the present invention supports a method for extracting tagged data items that may be associated with results of a search in an electronic document and presenting the tagged data items through a GUI. The tagged data may be presented in a separate window displaying search results. The tagged data items may be presented adjacent to individual search results or at the top of a window displaying search results or in another configuration. The displayed tagged items may be presented as hyperlinks that enable a user to move to a section of an electronic document containing that tagged data item. The tagged data items, which may include names, physical addresses, e-mail addresses, URLs, dates, and telephone numbers, may represent a subset of the tagged data item categories contained in the electronic document.

What is claimed is:

1. A computer-implemented method for displaying one or more tagged data items proximate to a result of a search of an electronic document, comprising the steps of:

locating one or more of the search results generated by the search of the electronic document;

identifying each of the tagged data items present in the electronic document within a distance from each search result using a proximity rule, wherein identifying each of the tagged data items comprises:

calculating the distance between each search result and each tagged data item; and         determining if the calculated distance is less than a distance criterion, wherein the distance criterion is a predetermined number of lines of text;

identifying applicable tagged data items by determining whether the each of the tagged data items present in the electronic document should be associated with the one or more search results using grammatical semantic intelligence, the grammatical semantic intelligence comprising a rule that tagged data items that satisfy the proximity rule, with respect to the one or more search results, represent facts about search terms used in generating the search of the electronic document only when the search terms are proper nouns;

displaying on a user interface the one or more tagged items associated with each search result and identified as within the distance from each search result; and     removing a tag from a displayed item associated with the one or more search results by specifying in the user interface that the item should not be categorized, wherein the user interface comprises an on-object-user interface which receives a pointing action from a computer pointing device for pointing at the displayed item, the pointing action causing the generation of a menu for removing the tag in the on-object user interface.

2. The method of claim 1 wherein the distance from each search result comprises the distance between a first paragraph mark and a second paragraph mark, wherein one or more of the search results are located between the first paragraph mark and the second paragraph mark within the electronic document.

3. The method of claim 1 wherein the one or more tagged items identified as within the distance from each search result are displayed by the user interface in a window separate from a window displaying content of the electronic document.

4. The method of claim 3 wherein any of the tagged items identified as within the distance from each search result are displayed at the top of the separate window and the one or more search results are displayed beneath the displayed tagged data items.

5. The method of claim 3 wherein each tagged item identified as within the distance from one or more search result is displayed adjacent to the search result in the separate window.

6. The method of claim 1 further comprising the step of determining the tagged data items present in the electronic document within a distance from each search result that comprise a subset of the tagged data items based on a search term, prior to displaying the tagged data items.

7. The method of claim 1 wherein each tagged data item is displayed as a hyperlink and each hyperlink corresponds to a location in the electronic document containing of the tagged data item.

8. The method of claim 1 wherein the one or more tagged data items belong to one or more categories of data.

9. The method of claim 8 wherein the categories of data comprise people's names, physical addresses, e-mail addresses, universal resource locators, dates, and telephone numbers.

10. The method of claim 1 wherein the distance criterion is a number of alphanumeric characters.

11. The method of claim 1 wherein the distance from each search result comprises a distance based on grammatical rules of a language comprising the electronic document.

12. A computer-implemented method for identifying one or more tagged data items proximate to a result of a search of an electronic document, comprising the steps of:

completing the search of the electronic document;

locating each result of the search within the electronic document;

determining if one or more of the tagged data items are present in the electronic document within a distance from each search result using a proximity rule, wherein the distance comprises a location of the one or more tagged data items relative to each search result;

identifying applicable tagged data items by determining whether the each of the tagged data items present in the electronic document should be associated with the one or more search results using grammatical semantic intelligence, the grammatical semantic intelligence comprising a rule that tagged data items that satisfy the proximity rule, with respect to the one or more search results, represent facts about search terms used in generating the search of the electronic document only when the search terms are proper nouns;

displaying on a user interface at least a portion of the electronic document using the tagged data items; and removing a tag from a displayed item associated with the one or more search results by specifying in the user interface that the item should not be categorized, wherein the user interface comprises an on-object-user interface which receives a pointing action from a computer pointing device for pointing at the displayed item, the pointing action causing the generation of a menu for removing the tag in the on-object user interface.

13. The method of claim 12 wherein the distance from each search result comprises the distance between a first paragraph mark and a second paragraph mark, wherein one or more of the search results are located between the first paragraph mark and the second paragraph mark.

14. The method of claim 12 wherein the distance from each search result comprises a distance based on grammatical rules of a language comprising the electronic document.

15. The method of claim 12 wherein the distance from each search result comprises the distance set by a user.

16. The method of claim 12 wherein the one or more tagged data items belong to one or more categories of data.

17. The method of claim 16 wherein the categories of data comprise people's names physical addresses, e-mail addresses, universal resource locators, dates, and telephone numbers.

18. A computer-readable storage device storing a set of computer-executable instructions implementing a method for displaying one or more tagged data items proximate to a result of a search of an electronic document, comprising the steps of:

locating one or more of the search results generated by the search of the electronic document;

identifying each of the tagged data items present in the electronic document within a distance from each search result using a proximity rule, wherein identifying each of the tagged data items comprises:

calculating the distance between each search result and each tagged data item; and determining if the calculated distance is less than a distance criterion, wherein the distance criterion is a predetermined number of lines of text;

identifying applicable tagged data items by determining whether the each of the tagged data items present in the electronic document should be associated with the one or more search results using grammatical semantic intelligence, the grammatical semantic intelligence comprising a rule that tagged data items that satisfy the proximity rule, with respect to the one or more search results, represent facts about search terms used in generating the search of the electronic document only when the search terms are proper nouns;

displaying on a user interface the one or more tagged items associated with each search result and identified as within the distance from each search result, wherein the one or more tagged items identified as within the distance from each search result are displayed in a window separate from a window displaying content of the electronic document; and removing a tag from a displayed item associated with the one or more search results by specifying in the user interface that the item should not be categorized, wherein the user interface comprises an on-object-user interface which receives a pointing action from a computer pointing device for pointing at the displayed item, the pointing action causing the generation of a menu for removing the tag in the on-object user interface.

19. The computer-readable storage device of claim 18 wherein the distance from each search result comprises the distance between a first paragraph mark and a second paragraph mark, wherein one or more of the search results are located between the first paragraph mark and the second paragraph mark.

20. The computer-readable storage device of claim 18 wherein the distance from each search result comprises a distance based on grammatical rules of a language comprising the electronic document.

21. The computer-readable storage device of claim 18 wherein any of the tagged items identified as within the distance from each search result are displayed at the top of the separate window and the one or more search results are displayed beneath the displayed tagged data items.

22. The computer-readable storage device of claim 18 wherein each tagged item identified as within the distance from one or more search result is displayed adjacent to the search result in the separate window.

23. The computer-readable storage device of claim 18 further comprising the step of determining the tagged data items present in the electronic document within a distance from each search result that comprise a subset of the tagged data items based on a search term, prior to displaying the tagged data items.

24. The computer-readable storage device of claim 18 wherein each tagged data item is displayed as a hyperlink and each hyperlink corresponds to a location in the electronic document containing of the tagged data item.

25. The computer-readable storage device of claim 18 wherein the one or more tagged data items belong to one or more categories of data.

26. The computer-readable storage device of claim 25 wherein the categories of data comprise people's names, physical addresses, e-mail addresses, universal resource locators, dates, and telephone numbers.

* * * * *